W. F. BULTMANN.
REED ORGAN.
APPLICATION FILED FEB. 26, 1912.
1,053,273. Patented Feb. 18, 1913.
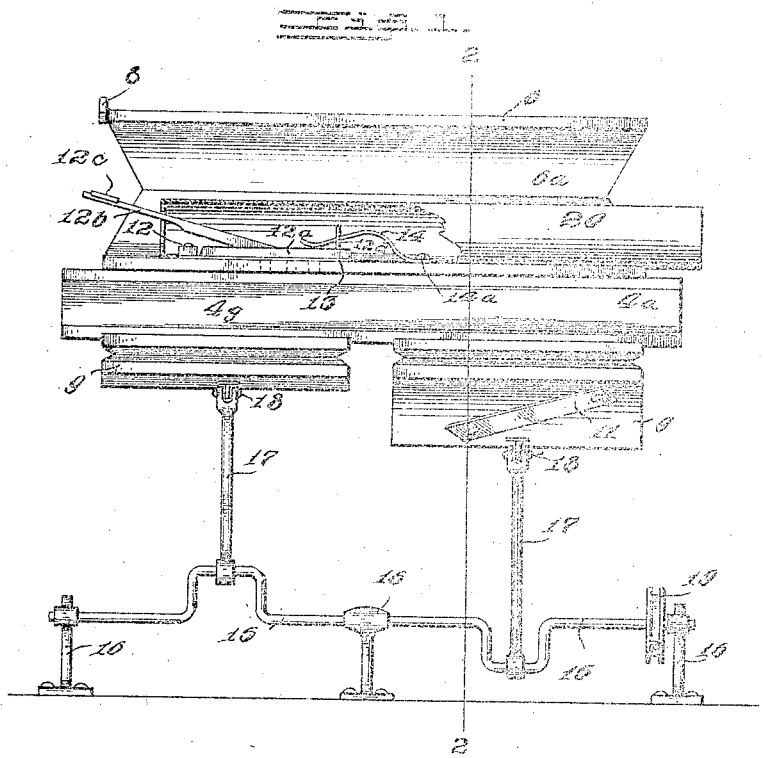
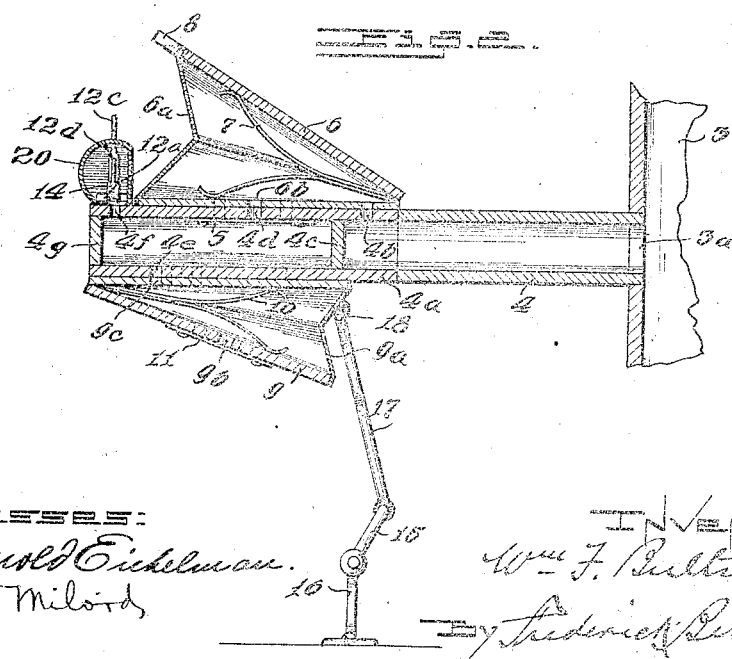
WITNESSES:
W. Harold Eichelman
M. A. Milord
INVENTOR:
Wm. F. Bultmann
By Frederick Benjamin
Atty.

UNITED STATES PATENT OFFICE.

WILLIAM F. BULTMANN, OF ELGIN, ILLINOIS.

REED-ORGAN.

1,053,273.

Specification of Letters Patent.   Patented Feb. 18, 1913.

Application filed February 26, 1912.   Serial No. 679,997.

*To all whom it may concern:*

Be it known that I, WILLIAM F. BULTMANN, citizen of the United States, residing at Elgin, in the county of Kane and State of Illinois, have invented certain new and useful Improvements in Reed-Organs, of which the following is a specification.

This invention relates to improvements in reed organs and like instruments in which the sound is produced either by air suction or air pressure upon the sound producing elements.

The especial object of the improvements embodied herein is to produce a combination of feeder bellows, reservoir and auxiliary communicating air chamber whereby the continued operation of the bellows will not strain the fabric of the reservoir.

A further object is to provide a construction which will avoid the spasmodic hissing incident to the use of ordinary relief valves on reservoirs, where the feeder bellows are continuously operated.

A further object is to provide a construction whereby the supply of air will be uniformly maintained in the reservoir notwithstanding the continued action of the motor or other means used for operating the feeder bellows.

In the accompanying drawing which forms a part of this application, I have shown a preferred adaptation of my invention in the following views:—

Figure 1 is a view in elevation of a pair of feeder bellows, means for operating same, and a reservoir, with auxiliary air chamber, all constructed and arranged according to my invention; Fig. 2 is a vertical section on line 2—2 of Fig. 1.

Referring to the details of the drawing, 3 represents a fragment of the portion of the wind-chest of any reed organ, in which there is an opening $3^a$ communicating with an auxiliary air reservoir or conduit 4, which is interposed between the main reservoir 6 and the feeder bellows 9. This auxiliary reservoir takes the place of the board which is ordinarily placed between the main reservoir 6 and the feeder bellows, and carries the valves controlling the openings between said members. The auxiliary reservoir is rectangular in form, and is provided with an extension $4^a$, in the upper wall of which is an opening $4^b$, and is divided into two chambers by a vertical partition $4^c$. Between the partition $4^c$ and the end wall $4^g$, the lower wall of the chamber has a series of openings $4^e$, and another series of exit openings $4^f$ are in its upper wall, besides the inlet opening $4^d$. The openings $4^d$ are controlled by the common form of strap valve 5 which is placed on the inner side of the upper wall of the auxiliary reservoir chamber, as clearly shown in Fig. 2.

6 represents the main reservoir, which is of the common bellows-type, and is normally maintained in expanded relation by the spring 7. The flexible side walls $6^a$, are collapsible in the usual manner, and in the lower wall of the reservoir is a series of openings $6^b$ which communicate and register with the openings $4^d$ in the upper wall of the auxiliary reservoir. At one corner of the reservoir 6 is a horizontally extending arm 8. The feeder bellows 9 are of the usual form, with flexible or collapsible walls $9^a$, and provided in the outer rigid walls with openings $9^b$ covered and controlled by strap valves 11, and in the inner wall with a series of openings $9^c$ which communicate and register with the openings $4^e$ in the lower wall of the auxiliary reservoir. The bellows 9 are expanded by the usual springs 10. Secured to the outer side of the top wall of the auxiliary reservoir by a screw 12, is a flap valve made up of a rigid back piece $12^a$ having a leather facing strip 13, and having an arm $12^b$ extending at an angle from the back piece. The top of the outer end of the arm $12^b$ is equipped with a piece of soft leather $12^c$. The leather facing strip 13 forms a hinge for this valve, and projecting upwardly at the free end of the latter, are pins $12^d$, between which rests the free end of a flat spring 14, which is secured at $14^a$, and has its extremity resting upon the upper side of the valve plate $12^a$.

15 represents a double-arm crank-shaft journaled in standard 16, and having connected with its cranks, pitmen 17 the other ends of which are hingedly connected at 18 to the outer walls of the bellows 9. Near one end of the shaft 15 is a grooved pulley 19 which may be driven by any suitable motor, driving means not being shown as they form no part of this invention.

The end $12^c$ of the arm $12^b$ is arranged in the path of the arm 8, as the latter descends by the collapsing of the reservoir 6, so that the depression of the upper wall of the reservoir 6, pressing downwardly on the arm $12^b$, will cause the free end of the lever 12$^a$ to be raised, and thus uncover the openings 4$^f$ in the upper wall of the auxiliary reservoir 4, thus relieving the main reservoir 6 from the direct action of the feeder bellows 9, as the air drawn in through the openings 4$^f$ will be drawn from the atmosphere instead of from the main reservoir. As soon as the reservoir is expanded, the tension of the spring 14 will close the valve 12$^a$ and restore the normal relation between the feeder bellows and the reservoir 6.

In order to avoid any audible noise from the air rushing under the valve 12$^a$ through the openings 4$^f$, I house the said valve, together with the spring 14 and a portion of the arm 12$^b$, in a cylindrical muffler 20 which is secured to the upper side of the auxiliary chamber 4, and has one end open.

It will be seen from the construction and operation above described, that it will not be necessary to stop a motor driving the pulley 19, when the reservoir 6 has been collapsed through the air exhausting action of the feeder bellows, as the continued action of said motor, while it will operate said bellows, will have no appreciable effect on the reservoir 6, as the air will be drawn directly from the atmosphere through the muffler and pass through the openings 4$^f$.

It will also be apparent that the presence of the auxiliary reservoir 4, with its constant volume of air, interposed between the feeder bellows and the reservoir 6, will prevent the spasmodic action of the valves and the reservoir, and hence the noise occasioned by such action in the constructions common to the art, will be avoided.

In actual practice it has been found that the reservoir will be collapsed to a predetermined point where the arm 8 will engage the valve arm 12$^b$, whereupon the valve 12$^a$ connected with said arm, will be opened sufficiently to relieve the reservoir from the exhaustive action of the feeder bellows, and said valve will be normally maintained in this relation, thus securing a well balanced action constant upon the reservoir, notwithstanding the feeder bellows will continue their pumping action.

It will be understood that the partition 4$^c$ will cause the air to pass directly from the auxiliary chamber on the right of said partition, as shown in the drawing, to the reservoir 6 through the opening 4$^b$.

Having thus described my invention, what I claim as new, is:—

1. In an organ including a wind-chest, the combination of an air reservoir, feeder bellows adapted to withdraw the air from said reservoir, an auxiliary air chamber interposed between said feeder bellows and reservoir, and communicating respectively therewith, and means whereby the auxiliary air chamber will be automatically relieved from the action of the feeder bellows, said automatic means operated by the reservoir.

2. In an organ including a wind-chest, the combination of a collapsible air-reservoir, feeder bellows adapted to withdraw the air from said reservoir, an auxiliary air chamber arranged between said feeder bellows and said collapsible air reservoir, said auxiliary reservoir divided into two non-communicating chambers one of said chambers communicating with the collapsible reservoir and with the wind-chest of the organ, and the other communicating with the collapsible reservoir and the feeder-bellows, said auxiliary reservoir chamber also communicating with the atmosphere, a valve controlling said last means of communication, and means for automatically opening said valve when the collapsible reservoir has reached a predetermined degree of collapsibility.

3. In a wind instrument of the class described, a wind-chest, a collapsible reservoir communicating with the wind-chest, a feeder-bellows adapted to operate upon said reservoir, a non-collapsible auxiliary chamber communicating with said bellows and reservoir, and having an opening to the atmosphere, and means controlling said opening and including said auxiliary chamber whereby excessive action of the feeder bellows upon the reservoir will be automatically prevented through the operation of the collapsible reservoir.

In testimony whereof I affix my signature in the presence of two witnesses.

WILLIAM F. BULTMANN

Witnesses:
F. BENJAMIN,
M. A. MILORD.